United States Patent [19]

Millward

[11] 3,769,574

[45] Oct. 30, 1973

[54] SYNCHRONISING SYSTEMS

[75] Inventor: John David Millward, Kimpton, Hitchin, England

[73] Assignee: Decca Limited, London, England

[22] Filed: Mar. 12, 1973

[21] Appl. No.: 340,014

[30] Foreign Application Priority Data

Mar. 14, 1972 Great Britain .................. 11,862/72

[52] U.S. Cl. .......... 323/101, 178/DIG. 28, 323/108, 328/155

[51] Int. Cl. .............................................. H04n 5/04

[58] Field of Search ................ 178/69.5 F, DIG. 28; 307/232; 318/608, 661; 323/101, 108, 119, 129; 328/133, 155

[56] References Cited

UNITED STATES PATENTS

| | | | |
|---|---|---|---|
| 3,288,923 | 11/1966 | Arimura et al. | 178/69.5 F |
| 3,579,069 | 5/1971 | Reuteler et al. | 318/608 X |
| 3,629,715 | 12/1971 | Brown et al. | 328/155 |

*Primary Examiner*—A. D. Pellinen
*Attorney*—John A. Mawhinney

[57] ABSTRACT

A system for synchronising a rotary member with a series of synchronising pulses, suitable for use in synchronising a film projector with a television scanning raster comprises a rotary member; a divider for obtaining two repetitive signals whose frequency is relatively small from a series of synchronising pulses fed to the said divider; a generator for providing in response to a first of the repetitive signals a repetitive sawtooth wave form of the same fundamental frequency as the first repetitive signal; a synchro-resolver having a stator arranged to be energised by a polyphase signal derived from the second of the two repetitive signals, and a rotor arranged to be driven in accord with the movement of the rotary member; a further generator responsive to the output of the synchro-resolver to provide a series of sampling pulses at a frequency proportional to the output of the synchro-resolver; and a comparator for comparing the phase of the sampling pulses with that of the repetitive sawtooth wave form so as to provide a control signal for operating the rotary member.

3 Claims, 1 Drawing Figure

PATENTED OCT 30 1973 3,769,574
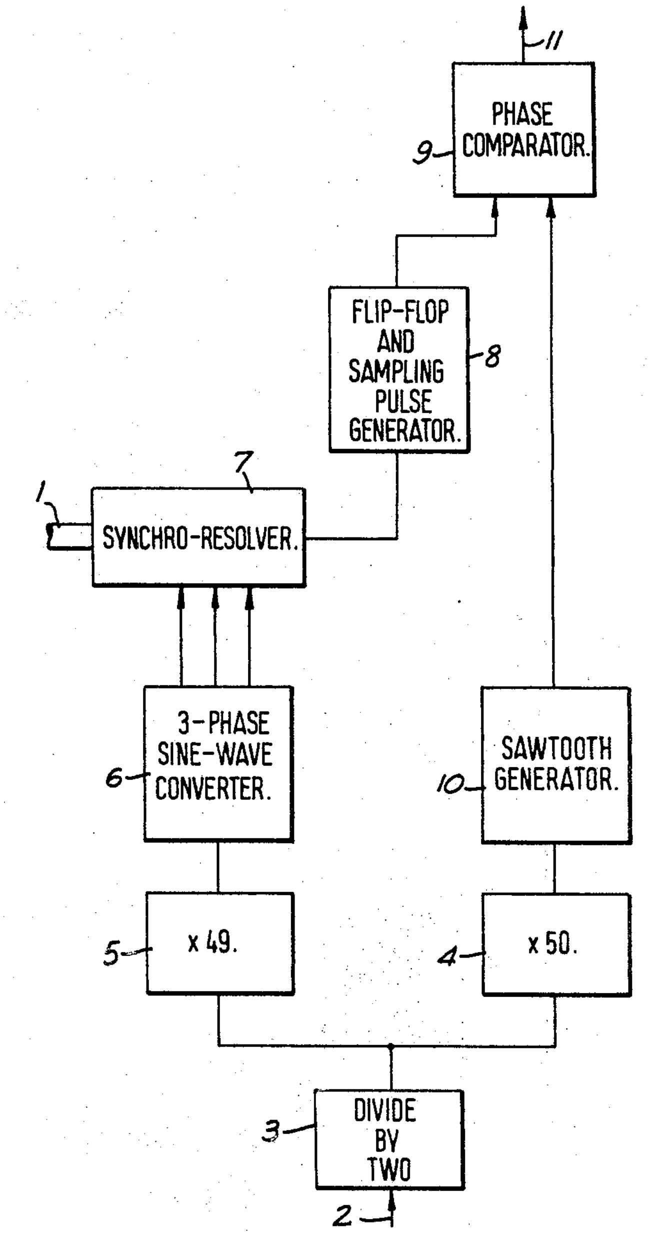

SYNCHRONISING SYSTEMS

This invention relates to systems for synchronising rotary members with synchronising pulses. The invention is particularly although not exclusively suitable for the synchronisation of film projectors with a television scanning raster during the conversion of cinematographic images to television picture signals. In these circumstances the rotary member would be a rotary drive member for the film in a projector and the synchronising signals may be the frame synchronising pulses controlling the raster.

It is known to generate, in response to the movement of the rotary member, a pulse for each revolution of the member, or for each half revolution, and to compare the pulses thereby obtained with incoming television synchronising pulses so as to obtain an error signal which can be used to advance or retard the rotary member into synchronism with the synchronising pulses. Such a system requires a substantial time to achieve a steady synchronised condition, especially if the shaft or other rotary member rotates at low frequency, such as about one revolution per second.

The object of the invention is to provide a system which facilitates relatively rapid synchronisation, by which is meant synchronisation of the rotary member with the synchronising pulses, in a time corresponding to one revolution of the rotary member or less.

According to the invention, a synchronising system comprises a rotary member; divider means to which is fed a series of synchronising pulses, for obtaining from the said series two repetitive signals whose frequency difference is relatively small; means for providing in response to a first of the repetitive signals a repetitive sawtooth wave form of the same fundamental frequency as the first repetitive signal; a synchro-resolver having a stator arranged to be energised by a polyphase signal derived from the second of the two repetitive signals, and a rotor arranged to be driven in accord with the movement of the rotary member; means responsive to the output of the synchro-resolver to provide a series of sampling pulses at a frequency proportional to the output of the synchro-resolver; and means for comparing the phase of the sampling pulses with that of the repetitive sawtooth waveform so as to provide a control signal for operating the rotary member.

Preferably the means responsive to the output of the synchro-resolver is arranged to provide a series of sampling pulses at a frequency equal to the output of the synchro-resolver.

Preferably also, the rotary member is arranged to commence rotation when the phase difference between the sampling pulses and the sawtooth waveform is a non-zero predetermined value.

Reference will hereinafter be made to the accompanying drawing which by way of example illustrates a synchronising system for use with a slow motion projector and an associated television camera.

As indicated hereinbefore, when the film in a film projector is scanned by a television raster it is necessary that the movement of the film in the projector is synchronised to the scanning rate in order to avoid undesirable image defects.

Projectors running at normal speed traverse a film by 24 or 25 frames per second and accordingly a shaft driving the film conveniently rotates at a similar number of revolutions per second. It is known practice to generate in accord with the movement of the input shaft one or two pulses per revolution and to compare these pulses with incoming television synchronising pulses to obtain an error signal by which a correct phase relationship can be maintained. It is normally necessary to generate about 25 or 50 pulses to achieve synchronisation and for a normal frame rate the starting condition usually lasts between 2 and 4 seconds. However if the projector runs at very much lower than normal speed, such as only 1 frame per second, the time required for synchronisation is very much longer.

In order to accelerate synchronisation the starting phase and time of the drive member should be accurately determined. Accordingly it is necessary to obtain information on the position of the stationary drive member, relative to the incoming synchronising pulses, just before starting is required. synchronising In the drawing is illustrated a main drive shaft 1 for a film projector which is to be operated at slow speed, typically 1 frame per second, the shaft revolving for this purpose at about 1 revolution per second. The shaft drives by means of a sprocket ordinary cinematographic film which is traversed through an optical gate wherein each frame is scanned by a television raster under the control of field synchronising pulses. The system in the drawing includes an input 2 at which these field synchrinising pulses appear. The frequency of the incoming synchronising pulses is divided by two in a divider 3 so as to obtain signals at one pulse per second, which is the same nominal frequency as the intended frequency of rotation of the drive shaft. These pulses are multiplied by fortynine and fifty by respective multipliers 4 and 5. Moreover the multipliers can be interchanged provided that the difference frequency still corresponds to the desired rotational frequency of the main drive shaft 1. Multiplication factors of about 50 are convenient for driving synchro-resolvers. If the frequency is too low, the rate at which phase information is produced is also low and a synchro-resolver used as hereinafter described becomes very bulky. The use of higher frequencies facilitates an increase in the rate of obtaining phase information but increases the complexity of multipliers.

The output from the multiplier 5 is converted to polyphase sinusoidal waves of the same frequency. Normally either two phase or three phase signals would be obtained. These signals are fed to the stator of a synchro-resolver 7 of which the rotor is driven in accord with the main drive shaft. In this particular example it may be directly coupled to that shaft.

The frequency of the output from the resolver will be the same as that of the output from the multiplier 5 when the rotor is stationary. This output is fed to a circuit including a bistable and a sampling pulse generator for producing sampling pulses at the same frequency.

The output from the other multiplier, the multiplier 4, drives a sawtooth generator 10, the frequency of the sawtooth being the same as that of the output of the multiplier 4.

A phase comparator 9 is arranged to compare the phases of the sampling pulses from the circuit 8 and the sawtooth signal. In this way the output 11 of the phase comparator will be a staircase having fifty steps, a frequency of one cycle per second and a mean level of zero.

As the magnitude of the staircase wave form approaches zero and at a predetermined level in advance of a zero crossing, circuits (not shown) may operate to generate a pulse for starting the rotation of the main drive shaft. Starting may be inhibited unless a suitable control, such as a start button has been operated.

During an initial starting period, tachometric information obtained from the rotation of the drive shaft may be used to control the rotation of the drive shaft in preference to the information obtained from the system described so far until a correct speed is obtained whereupon the phase control can provide rapid synchronisation, in respect of both velocity and phase, of the main drive shaft and synchronising pulses.

Accordingly the system described can provide information about the phase of the main shaft 1 relative to the incoming synchronising pulses and provide that information at a rate much faster than the rotational frequency of the shaft at any speed including zero speed.

I claim:

1. A synchronising system comprising a rotary member; divider means to which is fed a series of synchronising pulses for obtaining from the said series two repetitive signals whose frequency difference is relatively small; means for providing in response to a first of the two repetitive signals a repetitive sawtooth waveform of the same fundamental frequency as the first repetitive signal; a synchro-resolver including a stator arranged to be energised by a polyphase signal derived from the second of the two repetitive signals, and a rotor arranged to be driven in accord with the movement of the rotary member; means responsive to the output of the synchro-resolver to provide a series of sampling pulses at a frequency proportional to the output of the synchro-resolver; and means for comparing the phase of the sampling pulses with that of the repetitive sawtooth waveform so as to provide a control signal for operating the rotary member.

2. A synchronising system as claimed in claim 1, wherein the means responsive to the output of the synchro-resolver is arranged to provide a series of sampling pulses at a frequency equal to the output of the synchro-resolver.

3. A synchronising system as claimed in claim 1, wherein the rotary member is arranged to commence rotation when the phase difference between the sampling pulses and the sawtooth waveform is a non-zero predetermined value.

* * * * *